US006685838B2

United States Patent
Licata et al.

(10) Patent No.: US 6,685,838 B2
(45) Date of Patent: Feb. 3, 2004

(54) KERATIN PROTEIN ADSORPTION OF HEAVY METALS

(75) Inventors: Carlo Licata, Pasadena, CA (US); Rajendra Mehta, Reno, NV (US); Manoranjan Misra, Reno, NV (US)

(73) Assignee: Maxim LLC, Pasadena, CA (US)

( * ) Notice: Subject to any disclaimer, the term of this patent is extended or adjusted under 35 U.S.C. 154(b) by 283 days.

(21) Appl. No.: 09/876,663

(22) Filed: Jun. 6, 2001

(65) Prior Publication Data

US 2002/0108903 A1 Aug. 15, 2002

Related U.S. Application Data

(60) Provisional application No. 60/255,220, filed on Dec. 12, 2000.

(51) Int. Cl.$^7$ .................................................. C02F 1/42
(52) U.S. Cl. ........................................ 210/661; 210/688
(58) Field of Search ................................ 210/661, 688

(56) References Cited

U.S. PATENT DOCUMENTS

| | | |
|---|---|---|
| 3,931,002 A | 1/1976 | Ottenheym et al. |
| 4,141,888 A | 2/1979 | Matsuda et al. |
| 4,257,807 A | 3/1981 | Drobot |
| 4,289,531 A | 9/1981 | Lechavelier et al. |
| 4,869,829 A | 9/1989 | Casey |
| 5,411,573 A | 5/1995 | Kang et al. |
| 5,462,785 A | 10/1995 | Holland |
| 5,705,030 A | 1/1998 | Gassner, III et al. |
| 5,756,052 A | 5/1998 | Suzumura et al. |
| 5,779,392 A | 7/1998 | Mendes |

OTHER PUBLICATIONS

Dmowski, K., "Birds as Bioindicators of Heavy Metal Pollution: Review and Examples Concerning European Species," Acta Ornithologica 34/1 (1–25), 1999.

"Electrochemical Treatment of Alkaline Nuclear Wastes", (DOE Report DOE/EM–0560) (Jan. 2001).

Ishikawa et al., "Recovery and Refining of Gold by Gold Cyanide Ion Biosorption Using Animal Fibrous Proteins," Applied Bio. and Biotech. Part A: Enzyme Eng. and Biotech. Spring 1998, 70–72:719–728.

Niu et al., "Enhancement of Gold–Cyanide Biosorption by L–Cysteine," http://www.mcgill.ca/biosorption/publication/hn2spain/hn2sp.html.

Schmidt. et al., "Binding of Heavy Metal Ions to Fibers and Filters From Poultry Feathers," TAPPI Nonwovens Conference 97, 105–107.

Schmidt et al., "Fiber and Fiber Products from Feathers," http://hydrolab.arsusda.gov/ecl/Special%20Projects/feather.htm.

Suyama et al., "Biosorption of Precious Metal Ions by Chicken Feathers," Applied Bio. and Biotech. Part A: Enzyme Eng. and Biotech. Spring 1996, 57–58:67–74.

Tratnyek, J.P., "Waste Wool as a Scavenger for Mercury Pollution in Waters", Environmental Protection Agency, U.S. Printing Office, Washington, D.C., 1972.

Primary Examiner—Chester T. Barry
(74) Attorney, Agent, or Firm—Paul Hastings Janofsky & Walker LLP; Michael B. Farber

(57) ABSTRACT

A method of removing both Sr and Cs from an alkaline solution having a pH between about 9 to 14 includes providing a keratin protein from essentially a fiber portion separated from a quill portion of a poultry feather. A slurry is made of the keratin protein and the alkaline solution and is treated ultrasonically. The Sr and Cs may each be present in the alkaline solution at least at about 5 ppb. The keratin protein is contacted with the Sr and Cs by mechanical agitation at a temperature between about 20 to 90° C. and at a pressure not greater than about 10 psi. A supernatant produced in the step of contacting is then filtered.

29 Claims, 1 Drawing Sheet

KERATIN PROTEIN ADSORPTION OF HEAVY METALS

CROSS-REFERENCE TO RELATED APPLICATIONS

This application claims the benefit of U.S. Provisional application No. 60/255,220, filed Dec. 12, 2000.

BACKGROUND OF THE INVENTION

The present invention generally relates to the adsorption of heavy metals and, more particularly, to the adsorption of heavy metals such as Cs and Sr by keratin protein such as that found in feather fibers.

In a multitude of applications and environments, there is often a need to remove contaminants from solids, liquids, and gases. Those contaminants may be in one of many forms, including heavy metal ions. As one example, the U.S. Department of Energy (DOE) has generated large volumes of high-level radioactive water waste (HLW) from the reprocessing of spent uranium. The HLW contains significant levels of radioactive strontium (Sr) and cesium (Cs). The HLW is stored in stainless steel tanks underground. The HLW has been made highly alkaline (about pH 13) so as to not attack the tank material and leach through the walls. The high alkalinity of the material causes it to range in temperature between about 25 to 93° C. in the tanks.

The tanks can leak over time and cause radioactive environmental cleanup issues. For reasons of safety, the DOE wants to remove the HLW from the tanks and close the storage site. To date, the systems proposed to reduce the levels of Sr and Cs are expensive or capital intensive, with each having issues with them. For example, ion exchange resins have been evaluated in the environment. They, however, tend to be very expensive and to increase significantly in volume under use. A DOE report entitled "Electrochemical Treatment of Alkaline Nuclear Wastes", (DOE Report DOE/EM-0560) (January 2001) describes a process that electrochemically converts aqueous sodium nitrate/nitrite into sodium hydroxide and then chemically reduces the nitrogen species to gaseous ammonia, nitrous oxide, and nitrogen. This process is complex and capital intensive.

Keratin protein derived from natural sources has been shown to have an affinity for heavy metals (Tratnyek, J. P., "Waste Wool as a Scavenger for Mercury Pollution in Waters", Environmental Protection Agency, U.S. Printing Office, Washington, D.C., 1972). Keratin is a sulfur containing protein that may be found in epidermal outgrowths, such as feathers, horns, hoofs, hair, and wool. Given the naturally occurring and abundant sources of keratin, much interest has focused on its use for adsorbing metals, whether for eventual recovery or disposal.

In particular, keratin protein derived from chicken feathers has been used to adsorb gold, platinum, and palladium at about a desirable pH between 1 to 3. Suyama et al., "Biosorption of Precious Metal Ions by Chicken Feathers," Applied Bio. and Biotech. Part A: Enzyme Eng. and Biotech. Spring 1996, 57–58:67–74. Similarly, keratin protein was used to remove rhodium, ruthenium, gold, silver, iridium, zinc, aluminum, iron, copper, nickel, and tin preferably at a pH between 2 to 3 in U.S. Pat. No. 4,289,531. Maximum adsorption of gold-cyanide by chicken feathers has occurred around pH 2. Ishikawa et al., Recovery and Refining of Gold by Gold Cyanide Ion Biosorption Using Animal Fibrous Proteins, Applied Bio. and Biotech. Part A: Enzyme Eng. and Biotech. Spring 1998, 70–72:719–728.

Yet, the absorption process by keratin protein has been found to be slow, somewhat limited in absorption capacity in comparison to other adsorbents, and dependent upon a low pH. It is also generally accepted that naturally occurring keratin fibers have poor resistance to alkali treatment and can lose much of their mechanical strength when subjected to a high pH environment of about pH 9 to 14.

As can be seen, there is a need for a keratin protein method of adsorbing heavy metal ions by keratin protein, such as Cs and Sr, that can be used in a high pH environment of about 9 to 14 and also in a highly concentrated alkaline environment.

SUMMARY OF THE INVENTION

In one aspect of the present invention, a method of removing a heavy metal from an alkaline composition comprises providing a keratin protein from a feather; treating the keratin protein with ultrasonic or the like; making a slurry of the treated keratin protein; contacting the keratin protein with the alkaline composition of heavy metal by mechanical agitation or the like; and filtering a supernatant produced in the step of contacting.

In another aspect of the present invention, a method of removing at least one of Sr and Cs from an alkaline solution having a pH between about 9 to 14 comprises providing a keratin protein from a poultry feather (or turkey, duck, etc.); making a slurry of the keratin protein and the alkaline solution; treating the slurry with ultrasound; contacting the keratin protein with at least one of Sr and Cs by mechanical agitation or the like; and filtering a supernatant produced in the step of contacting.

In a further aspect of the present invention, a method of removing both Sr and Cs from an alkaline solution having a pH between about 9 to 14 comprises providing a keratin protein from essentially a fiber portion separated from a quill portion of a chicken feather; making a slurry of the keratin protein and the alkaline solution and subjecting the slurry to ultrasound, the Sr being present in the alkaline solution at least at about 5 ppb and up to about 100,000 ppb or more and the Cs being present in the alkaline solution at least at about 5 ppb and up to about 100,000 ppb or more; contacting the keratin protein with the Sr and Cs by mechanical agitation or the like, the step of contacting occurring at a temperature between about 20 to 90° C. and a pressure not greater than about 10 psi; and filtering a supernatant produced in the step of contacting.

These and other features, aspects and advantages of the present invention will become better understood with reference to the following drawings, description and claims.

DETAILED DESCRIPTION OF THE INVENTION

Figure 1:
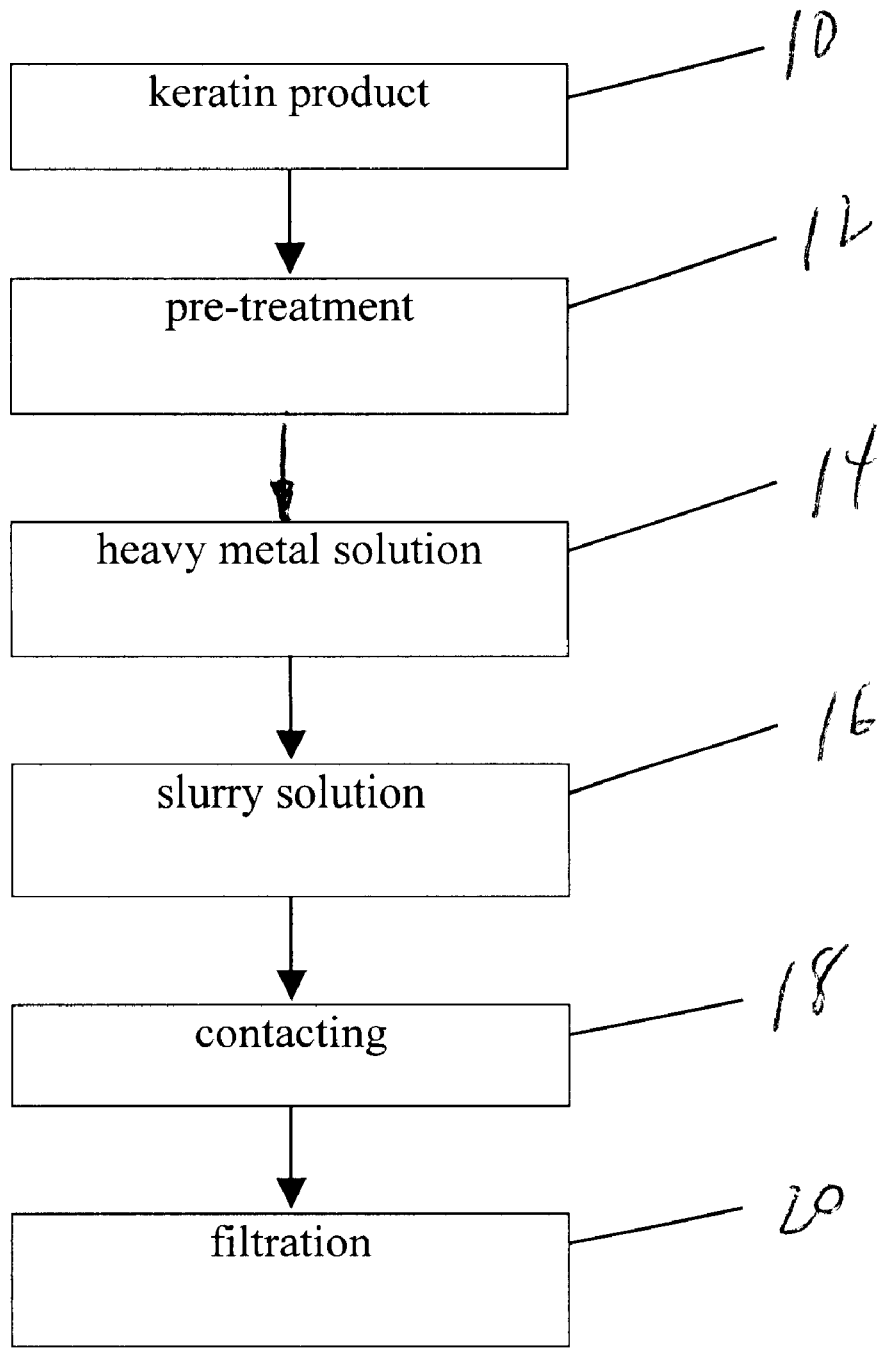
FIG. 1 is a flow diagram depicting the steps according to a method of removing heavy metals, such as Sr and Cs, according to the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Although the present invention is described in the context of removing heavy metals such as Sr and Cs from a solution, the scope of the present invention is not so limited. Rather, the present invention may be utilized in the context of removing heavy metals from a solid sludge. It may also be used for removing other heavy metals, for example, cadmium, copper, uranium, radium, gold, chromium, lead, mercury, and zinc.

In general, the present invention provides a method that is simple and low in cost for removing at least one heavy metal such as Sr and/or Cs from large volumes of alkaline compositions such as high-level radioactive water waste. A keratin protein is used for fast (e.g., within a reaction time of about 10 minutes) and high absorption capacity (e.g., up to about 200 mg/gm of keratin protein and is dependent upon the initial heavy metal concentration) in a high pH environment, such as about a pH between about 9 to 14 and high temperature environment, such as between about 20 to 90° C. This is in contrast to the prior art. Unexpectedly, the keratin protein shows little loss of weight in this environment. While it is preferred that the source of the keratin protein is feather fiber, other fibrous keratin sources, such as wool; egg shell membrane; silk; spider webs; animal and human hair; animal and human nails; and animal and human skin, can be used.

Referring to FIG. 1, a method of removing one or more metals from a composition that may be alkaline is shown in accordance with the present invention. A step 10 includes providing a keratin protein in the form of particles. Preferably, the keratin protein is from a feather, such as that of a chicken. More preferably, the keratin protein is from the fiber portion of the feather as compared to the quill portion. Thus, the keratin protein may be essentially only the fiber portion of a chicken feather that has been separated from the quill portion. What is meant by "essentially" is that the keratin protein is characterized by a fiber to quill weight ratio of at least about 1:1. The manner of preparing and then separating the fiber from the quill does not comprise a part of the present invention and may be accomplished by known methods such as that described in U.S. Pat. No. 5,705,030 and incorporated herein by reference.

The size of the keratin protein particles provided may vary from about 2 mm to 0.01 mm. Preferably, however, the size is between about 2 mm to 0.1 mm, and more preferably between about 1 mm to 0.1 mm. The keratin protein may be in the form of a powder or a fiber.

Regardless of the size or form, the keratin protein may undergo a pre-treatment step 12 prior to the below steps to clean the protein particles and remove contaminants, such as solvents, that may be present from the preparation of the material in accordance with U.S. Pat. No. 5,705,030. The pre-treatment may also include opening of the micropores in the keratin particles. Further, the pre-treatment may encompass the breaking or exposing of disulfide bonds in the keratin particles to increase or maximize the ability of sulfur atoms in the keratin to bond to the heavy metal(s). The pre-treatment may generally be carried out by agitating or exciting the keratin particles, such as ultrasonically at a frequency of about 20 to 40 KHz for about 40 seconds to 5 minutes. Alternatively, the agitation or excitation may be accomplished by mechanical mixing at about 300 to 600 rpm for about 10–15 minutes. Yet another means is by UV treatment.

In step 14, the treated or agitated keratin protein from above is mixed with a composition having at least one metal ion, such as a heavy metal ion. The heavy metal composition may be in various forms, such as a solution or sludge. The number and types of metal ions may vary. However, the present invention may be particularly useful for the adsorption of Sr and/or Cs. Although the present invention may be used for non-alkaline compositions, a heavy metal composition having an alkaline pH (i.e., at least about 7.0) is most useful in application. In fact, the present invention may be applicable for compositions up to a pH between about 9 to 14 and, indeed, have greater applicability at a pH range between about 12 to 14.

Upon mixing the treated keratin protein and heavy metal composition, a slurry composition such as a solution is made in step 16. What is meant by "slurry" is a mixture of solid/liquid/feather materials. In the event the heavy metal composition from above is in the form of a sludge, an aqueous medium may be added to the mixture from step 14 to form the slurry. On the other hand, if the heavy metal composition is in the form of a solution, an aqueous medium is not needed.

The slurry may be characterized by an initial keratin protein concentration and/or an initial heavy metal concentration. While these concentrations may vary, the present invention contemplates an initial keratin protein concentration between about 0.1 to 10 mg/mL, although it can be altered for a particular application. Preferably, the keratin protein concentration is between about 1 to 2 mg/mL and, more preferably, about 2 mg/mL. The initial heavy metal concentration for a single metal may vary from at least about 5 ppb and up to about 100,000 ppb and more. Preferably, the initial heavy metal concentration is between about 10 to 300 ppb, and more preferably between about 10 to 100 ppb.

Next, in step 18, the keratin protein is contacted with the heavy metal(s) in order to mix the keratin protein with the heavy metal composition and allow the heavy metal(s) to be adsorbed by the keratin protein. This can be achieved by means such as mechanical agitation of the slurry. The mechanical agitation can be as simple as mechanical shaking of a vessel. In such case, the mechanical agitation may occur over a period of about 30 sec to 10 minutes when the slurry is of a volume between about 500 to 1000 cc. In practice, ultrasound may be alternatively employed to increase the heavy metal adsorption as the initial concentration of keratin protein in the slurry is increased. In that case, the ultrasound may occur over a period of about 30 seconds to 5 minutes at about 20 to 45 KHz when the slurry is a volume between about 500 cc to 5 liters.

Although the temperature at which step 18 is not crucial to accomplishing step 18, the present invention enables the adsorption of heavy metals to occur at a relatively high temperature environment. Accordingly, the step 18 of contacting may occur at a temperature in excess of about 20° C. and up to about 90° C. However, it should be understood that step 18 may be carried out at lower temperatures, if desired.

Likewise, step 18 may be carried out at various pressures. However, the regulation of pressure may result in decrease or increase in adsorption. Accordingly, a typical pressure during step 18 may be not more than about 10 psi and is preferably atmospheric pressure.

Following step 18, a step 20 of filtering the slurry may be employed. Doing so can separate a supernatant of keratin protein with adsorbed metal ions from the remainder of the slurry. Filtration can occur by well-known methods such as pressure and/or vacuum. Thereafter, the supernatant may be then be vitrified, for example, with cements, glasses, and polymer based binders, for disposal.

EXAMPLES

Example 1

A strontium test solution was produced by first dissolving analytical grade strontium carbonate in an acid medium. The supernatant was then transferred to an alkaline medium. The alkaline medium (i.e., waste water composition) was produced as per DOE guidelines. The composition is listed below in Table 1.

TABLE 1

Alkaline Liquid Waste Composition

| Component | Concentration |
|---|---|
| $NaNO_3$ | 2.6M |
| NaOH | 1.3M |
| $Na_2SO_4$ | 0.521M |
| $NaNO_2$ | 0.134M |
| $Na_2CO_3$ | 0.026M |
| $NaAl(OH)_4$ | 0.429M |
| TOTAL | 5.6M |

The above alkaline medium contained dissolved strontium and represented a stock solution with a strontium concentration of 92.8 mg/L and a pH of about 13. One mg of stock solution was diluted to 100 ml which represented a batch test.

Feather fiber was obtained in accordance with the following method of preparation. Feathers with a total weight of 330 pounds were charged into a horizontal washer/centrifuge manufactured by Lorch, AG, of Esslingen, Germany. The feathers were then subjected to an initial hot water agitation and cleaning with 200 to 700 gallons of water heated to a temperature between 60 and 90° C., for a varying period of time. After spin-drying the feathers with the centrifugal device built into the wash machine, the dirty water effluent was discharged.

After the initial cleaning cycle above, the feathers were subjected to the second part of the cleaning cycle, which required the inclusion of a surfactant and bactericide to the same amount of water and the same temperature and times ranges described above. The surfactant and the bactericide/anti-microbial were combined (i.e., Mixxocydin) and utilized at the rate of one to six percent of the wash-water. After completion of this wash cycle, the centrifugal spin cycle was repeated. A final rinse with water alone was effected, and after the final spin, the clean but still wet feathers were discharged to the feather drying system.

The dryer/after-cooler system, also manufactured by Loch, is two interlinked pieces of machinery having a dryer and after-cooler. The dryer and after-cooler operate on a three-hour cycle time, so it became necessary to accumulate three washer cycles of cleaned feathers in a holding silo for a single charge into the dryer/after-cooler. The dryer employs ambient air heated to 130° C., and turbulent air flow to achieve the desired dryness, which approaches 1% moisture in the product. The after-cooler employs the same concept as the dryer, except that turbulent air is employed to reduce the cleaned feather temperature to 40–50° C. The cleaned and dried feathers were allowed to reach ambient temperature.

The particle size of the feather was reduced by a pre-grinder manufactured by Security Engineered Machinery Co. of Westboro, Mass. The pre-grinder reduced the feather stock to smaller pieces, partially removed the fiber from the quill, and produced particle sizes up to ⅜ inches long. Next, the particles were subjected to a shearing knife mill manufactured by Fitzpatrick Co. of Elmhurst, Ill. The mill completes the separation, and reduces the quill size to less than 0.42 mm and fiber that is ½ to 1 mm long. The resultant mixture was about 50% quill and 50% fiber. To separate the fiber from the quill, the separator illustrated in FIG. 3B of U.S. Pat. No. 5,705,030 was employed.

Predetermined quantities of feather fiber from above were added in 100 ml of the batch test solution to make a slurry and shaken for about 2 hours. After contact, the slurry was filtered and the supernatant was analyzed for Sr. The results are listed below in Table 2.

TABLE 2

Sr Removal from Test Solution Results

| Feather, mg | Initial Sr, ppb | Final Sr, ppb | % Sr Removal |
|---|---|---|---|
| 0 | 928 | — | NA |
| 10 | 928 | 599 | 36 |
| 50 | 928 | 150 | 84 |
| 100 | 928 | 363 | 60 |

It can be seen that the fiber was able to remove about 80% of the Sr from an alkaline solution.

Example 2

The feather material from Example 1 was then tested at a lower initial concentration to measure the performance of the material. It is well known that adsorbent performance is based on the initial concentration. Results are listed below in Table 3.

TABLE 3

Sr Removal from Lower Concentration Test Solution

| Feather, mg | Initial Sr, ppb | Final Sr, ppb | % Sr Removal |
|---|---|---|---|
| 0 | 92.8 | — | NA |
| 5 | 92.8 | 13 | 86 |
| 10 | 92.8 | 30 | 68 |
| 20 | 92.8 | 20 | 78 |

It can be seen that the feather material continued to pick-up between about 70 to 80% Sr.

Example 3

It was decided to try to increase the adsorption of the feather material by subjecting it to ultrasonic treatment (UST). Five grams of feather material from Example 1 was soaked in 100 ml of water at pH 12. The slurry was then exposed to ultrasonic treatment at 40 KHz for 40 seconds. The ultrasonically pretreated material was then filtered, washed, and dried. The dried material was ground in a vibratory mill for 10 minutes. This material was compared to milled product without ultrasonic treatment for Sr adsorption. Results are listed in Table 4.

TABLE 4

Effect of Ultrasonics on Sr Removal (Initial Sr at 92.8 ppb)

| Feather, mg | UST (y/n) | Final Sr, ppb | % Sr Removal |
|---|---|---|---|
| 2 | y | 27 | 71 |
| 2 | n | 28 | 70 |
| 4 | y | 27 | 71 |
| 4 | n | 27 | 71 |
| 6 | y | 27 | 71 |
| 6 | n | 27 | 71 |
| 8 | y | 10 | 89 |
| 8 | n | 27 | 71 |
| 10 | y | 18 | 81 |
| 10 | n | 26 | 72 |

It is evident that, at heavier dosages of feather fiber, the ultrasonic treatment of the feather fiber has an impact on the adsorption of Sr at higher loadings of feather fiber in the test bath.

Example 4

Cesium was tested for uptake by the feather fiber of Example 1. The test solutions were prepared using a 1000 ppm standard solution of Cesium and the alkali waste liquid of Example 1. Different amounts of feather fiber were prepared as in the strontium removal in Table 4 above. The treated feather fiber was contacted with a Cs solution diluted to 100 ppb and 100,000 ppb, respectively. The feather fiber was left in the shaking test solutions for 2 hours and then filtered. Results are presented in Table 5 and indicate that Cs is readily adsorbed by the feather fiber.

TABLE 5

Adsorption Results at Various initial Concentrations of Cs

| Feather, mg | Initial Cs, ppb | Final Cs, ppb | % Cs Removal |
|---|---|---|---|
| 2 | 100 | 8 | 92 |
| 4 | 100 | 6 | 94 |
| 6 | 100 | 8 | 92 |
| 8 | 100 | 7 | 93 |
| 10 | 100 | 6 | 94 |
| 50 | 100,000 | 575 | 99 |
| 50 | 100,000 | 619 | 99 |
| 100 | 100,000 | 564 | 99 |
| 100 | 100,000 | 587 | 99 |
| 200 | 100,000 | 117 | 100 |
| 200 | 100,000 | 609 | 99 |
| 400 | 100,000 | 564 | 99 |
| 400 | 100,000 | 609 | 99 |
| 1000 | 100,000 | 621 | 99 |
| 1000 | 100,000 | 599 | 99 |

Example 6

A test was conducted to determine the weight loss that occurred when the feather fiber was soaked in the alkaline pH solution at an elevated temperature. It was expected that the fiber would essentially dissolve in the environment. A known amount of feather fiber of Example 1 was weighed and dried to remove all moisture. It was then added to the DOE suggested sludge of Example 1 at 60° C. and allowed to circulate for 2 hours. It was then removed, washed, dried, and weighed. Percent weight loss was calculated. It was found that the as-received feather fiber had a moisture content of about 6%. The weight loss was measured after soaking at ambient and at elevated temperature for 2 hours. The weight loss was 0% at ambient and only 8% at elevated. This was unexpected because generally raw feather is unstable at an elevated temperature and proteins tend to have extremely poor alkali resistance.

As can be appreciated by those skilled in the art, the present invention provides a method of using keratin protein to adsorb metal ions in a way that is quick, efficient, and without the need for several processing steps. The present invention also allows the adsorption to be carried out at a high pH and high temperature, thereby providing greater flexibility in use.

It should be understood, of course, that the foregoing relates to preferred embodiments of the invention and that modifications may be made without departing from the spirit and scope of the invention as set forth in the following claims.

We claim:

1. A method of removing a heavy metal from a composition, comprising:
   providing a keratin protein;
   agitating said keratin protein;
   making a slurry of said agitated keratin protein;
   contacting said agitated keratin protein with said heavy metal composition; and
   filtering a supernatant produced in the step of contacting.

2. The method of claim 1, wherein said keratin protein is selected from the group consisting of feather, wool, egg shell membrane, silk, spider web, animal hair, human hair, animal nail, human nail, animal skin, and human skin, or their components.

3. The method of claim 2, wherein said feather is from one of a chicken, turkey, and duck.

4. The method of claim 3, wherein said slurry comprises said agitated keratin protein at a concentration from about 0.1 to 10 mg/mL.

5. The method of claim 4, wherein said heavy metal is selected from the group consisting of Sr and Cs.

6. The method of claim 5, wherein said keratin protein is characterized by a size between about 2 mm to 0.01 mm.

7. A method of removing a heavy metal from an alkaline composition, comprising:
   providing a keratin protein from a feather;
   agitating said keratin protein by one of ultrasound, mechanical mixing, and ultraviolet;
   making a slurry of said agitated keratin protein combined with said alkaline composition;
   contacting said agitated keratin protein with said heavy metal; and
   filtering a supernatant produced in the step of contacting.

8. The method of claim 7, wherein said feather is from one of a chicken, turkey, and duck.

9. The method of claim 8, wherein said alkaline composition is characterized by a pH between about 9 to 14.

10. The method of claim 9, wherein said heavy metal is selected from the group consisting of Sr and Cs.

11. The method of claim 10, wherein said heavy metal is initially present in said alkaline composition at a concentration of at least about 5 ppb.

12. The method of claim 10, wherein said slurry is characterized by a keratin protein concentration between about 0.1 to 10 mg/mL.

13. The method of claim 12, wherein said keratin protein concentration is between about 10 to 1000 mg/mL and the step of contacting comprises mechanical agitation.

14. The method of claim 12, wherein said keratin protein concentration is between about 10 to 1000 mg/mL and the step of contacting comprises ultrasound.

15. The method of claim 9, wherein the step of contacting occurs at a pressure not greater that about 10 psi.

16. The method of claim 9, wherein the step of contacting occurs at a temperature between about 20 to 90° C.

17. A method of removing at least one of Sr and Cs from an alkaline solution having a pH between about 12 to 14, comprising:
   providing a keratin protein from a poultry feather;
   pre-treating said keratin protein to include at least one of opening micropores in said keratin protein and increasing an ability of sulfur atoms in said keratin protein to bond to Sr and Cs;
   making a slurry of said pre-treated keratin protein and said alkaline solution;
   contacting said pre-treated keratin protein with said at least one of Sr and Cs; and
   filtering a supernatant produced in the step of contacting.

18. The method of claim 17, wherein said keratin protein comprises essentially a fiber portion of said poultry feather.

19. The method of claim 18, wherein said keratin protein is produced by separating said fiber portion from a quill portion of said poultry feather.

20. The method of claim 17, wherein said alkaline solution is characterized by a pH between about 9 to 14.

21. The method of claim 20, wherein said alkaline solution is characterized by a Sr concentration of at least about 5 ppb.

22. The method of claim 21, wherein the step of contacting comprises mechanical agitation and said Sr is initially present in said alkaline solution at about 92.8 to 928 ppb.

23. The method of claim 22, wherein said slurry is characterized by a keratin protein concentration between about 0.1 to 1.0 mg/mL.

24. The method of claim 21, wherein the step of contacting comprises ultrasound and said Sr is initially present in said alkaline solution at about 92.8 ppb.

25. The method of claim 24, wherein said slurry is characterized by a keratin protein concentration between about 0.02 to 0.10 mg/mL.

26. The method of claim 17, wherein said alkaline solution is characterized by a Cs concentration of at least about 100 ppb.

27. The method of claim 26, wherein the step of contacting comprises mechanical agitation and said Cs is initially present in said alkaline solution at about 100 to 100,000 ppb.

28. The method of claim 17, wherein said supernatant comprises said keratin protein adsorbed with said at least one of Sr and Cs.

29. A method of removing both Sr and Cs from an alkaline solution having a pH between about 12 to 14, comprising:

providing a keratin protein from essentially a fiber portion separated from a quill portion of a poultry feather;

opening micropores of said keratin protein;

breaking or exposing disulfide bonds of said keratin protein;

making a slurry of said keratin protein and said alkaline solution, said Sr being present in said alkaline solution at least at about 92 ppb and said Cs being present in said alkaline solution at least at about 100 ppb;

contacting said keratin protein with said Sr and Cs by one of ultrasonics and mechanical agitation, the step of contacting occurring at a temperature between about 20 to 90° C. and at a pressure not greater than about 10 psi; and filtering a supernatant produced in the step of contacting.

* * * * *